United States Patent
Gray, Jr.

(10) Patent No.: US 6,619,325 B2
(45) Date of Patent: Sep. 16, 2003

(54) HYDRAULIC HYBRID ACCUMULATOR SHUT-OFF VALVE

(75) Inventor: Charles L. Gray, Jr., Pinckney, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 0 days.

(21) Appl. No.: 10/000,022

(22) Filed: Dec. 4, 2001

(65) Prior Publication Data
US 2003/0102041 A1 Jun. 5, 2003

(51) Int. Cl.[7] ................................................. F16L 55/04
(52) U.S. Cl. ......................... 138/30; 138/26; 137/495; 251/82; 251/83
(58) Field of Search ........................ 138/30, 26; 137/495; 251/82, 83

(56) References Cited

U.S. PATENT DOCUMENTS

| | | | | |
|---|---|---|---|---|
| 1,579,940 A | * | 4/1926 | Iversen | |
| 2,385,016 A | * | 9/1945 | Mercier | 138/30 |
| 3,148,702 A | * | 9/1964 | Mercier | 138/30 |
| 4,067,360 A | * | 1/1978 | Zirps | 138/30 |
| 4,164,242 A | * | 8/1979 | Sandau | 138/30 |
| 4,307,654 A | * | 12/1981 | De Almeida | 251/63.4 |
| 4,338,968 A | * | 7/1982 | Mercier | 138/30 |
| 4,526,205 A | * | 7/1985 | Sugimura et al. | 138/30 |
| 4,784,182 A | * | 11/1988 | Sugimura | 138/30 |
| 5,261,471 A | * | 11/1993 | Freigang et al. | 251/83 |
| 6,131,606 A | * | 10/2000 | O'Neill | 137/495 |

* cited by examiner

Primary Examiner—James Hook
(74) Attorney, Agent, or Firm—Lorusso, Loud & Kelly

(57) ABSTRACT

A hydraulic accumulator is equipped with a novel shut-off valve. The shut off-valve includes a valve body having a cylindrical hollow with a valve seat surrounding one end. The main piston including a piston head has a central opening and is slidably mounted within the cylindrical hollow of the valve body. A poppet valve has a valve head which mates with the valve seat and a valve stem which extends through the central opening of the piston to guide axial movement of the poppet valve relative to the piston. A spring is mounted between the valve head and the main piston head for urging the valve head away from the piston head. A control valve moves the piston relative to the valve body between open and closed positions responsive to signals from a computer which signals valve closing upon determination that flow rate through the valve exceeds a maximum period. The spring between the poppet valve head and the piston head exerts a force approximately equal to that of a pressure drop across the poppet valve at a predetermined maximum flow rate.

24 Claims, 6 Drawing Sheets

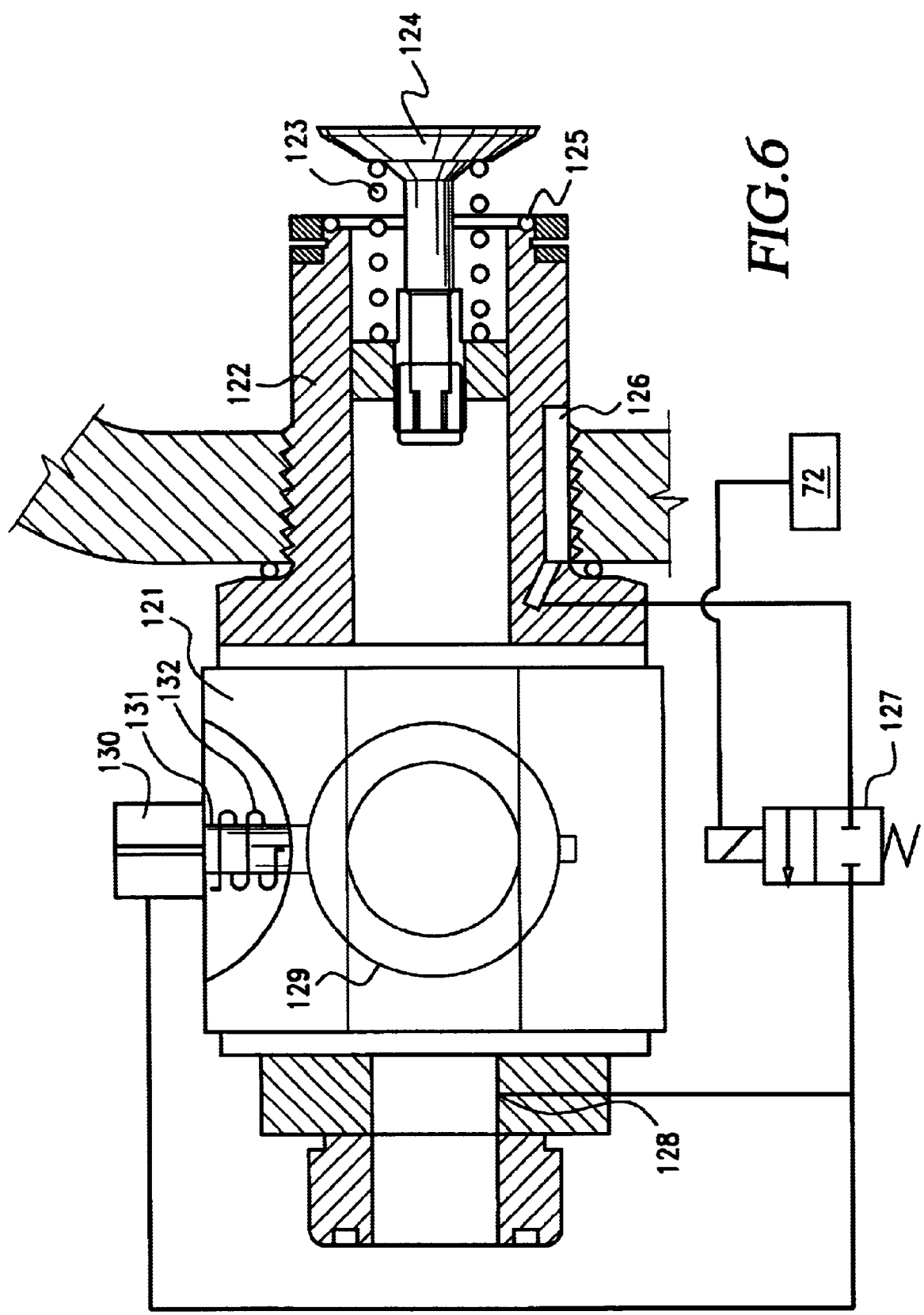

HYDRAULIC HYBRID ACCUMULATOR SHUT-OFF VALVE

BACKGROUND OF THE INVENTION

1. Field of the Invention

The principal utility of the invention is to improve the efficiency of motor vehicles and thus reduce green house gas emissions. More specifically, the field of the invention is hybrid vehicular drivetrains combining at least one hydraulic motor with an internal combustion engine.

2. Prior Art

Hydraulic hybrid vehicles utilize accumulators to store mechanical energy which is recovered from braking the vehicle and/or excess energy generated by the engine. See U.S. Pat. No. 5,495,912 and U.S. patent application Ser. No. 09/479,844 (pending) for details of the use of accumulators in hydraulic hybrid vehicles. However, control of the flow of high pressure hydraulic fluid into and out of the accumulator represents a potential safety problem in the use of hydraulic hybrid drivetrains.

Conventional accumulators are made in several designs including: piston accumulators wherein the piston in a cylindrical accumulator vessel separates hydraulic fluid from a gas (usually nitrogen) which is compressed to store energy by liquid flowing into the vessel, bladder accumulators which use an elastic bladder to separate the hydraulic fluid from the gas, and diaphragm accumulators which use a diaphragm to separate the hydraulic fluid from the gas.

FIG. 1 shows a cross section of the liquid entrance and valve end of a conventional bladder accumulator 10 which is a cylindrical vessel with domed ends. Pressures up to 5,000 pounds per square inch (psi) are common for such a high pressure accumulator that would be used on a hydraulic hybrid vehicle. Hydraulic fluid is pumped into and discharged out of the accumulator through port 11. The liquid flows around poppet valve 12 into the liquid chamber 13 of the accumulator. The accumulator walls 14 must be sufficiently strong to safely contain the high pressure liquid. A compressed gas (usually nitrogen) is contained within a sealed, elastic bladder 15. Spring 16 keeps valve 12 open for normal operation. Valve assembly 17 can be removed from the accumulator if necessary. For a 5,000 psi accumulator, the gas in bladder 15 is usually pre-compressed to between 1,600 and 2,000 psi before any liquid is pumped into the accumulator, to maximize the energy which can be stored within the accumulator. When the bladder 15 is pressurized by admitting high pressure gas through a valve in the other end (not shown), the elastic bladder 15 expands against poppet valve 12 and compresses spring 16 to shut valve 12. With valve 12 shut, bladder 15 is prevented from being extruded through fluid port 11 and rupturing the bladder. Hence the name commonly given to valve 12 is "anti-extrusion valve", as this is its design function. When liquid is then pumped through port 11 at a pressure higher than the bladder pre-charge pressure, valve 12 is forced open and liquid flows into chamber 12 compressing bladder 15 and the gas contained therein. When sufficient liquid is pumped into chamber 13 to compress the gas in bladder 15 to 5,000 psi, the volume of the gas and bladder is reduced to approximately one third of its original volume, and substantial energy is stored in the compressed gas. When power is needed by the driver of the vehicle, liquid may be allowed to flow from the accumulator to a hydraulic motor to propel the vehicle. As liquid exits the accumulator, the bladder 15 expands. If liquid continues to be withdrawn down to the bladder 15 pre-charge pressure, the bladder will push against valve 12, shutting valve 12, stopping the further withdrawal of liquid and preventing extrusion of the bladder 15. Spring 16 prevents the flow of liquid out of the accumulator from pre-maturely shutting valve 12.

Anti-extrusion valve assembly 17 performs well in conventional applications of hydraulic accumulators. However, additional valve functions are necessary for the utilization of an accumulator in a hydraulic hybrid vehicle. In the prior art these additional valve functions can be provided only by utilizing separate valve assembles.

SUMMARY OF THE INVENTION

Accordingly, it is an object of the present invention to improve safety of hydraulic hybrid drivetrains by improving control of high pressure hydraulic fluid into and out of an accumulator in the drivetrain by provision of an improved accumulator shut-off valve.

The present invention provides a unique means for providing the function of preventing the extrusion of the bladder when the liquid content approaches zero and the pre-charged gas in the bladder (at 2000 psi for a 5000 psi accumulator, for example) would otherwise force the bladder out of the accumulator.

More specifically, the present invention provides a shut-off valve for a hydraulic accumulator in a hybrid vehicular drive train which includes a valve body having a cylindrical hollow with a valve seat surrounding one end of the cylindrical hollow and, slidably mounted therein, a piston including a piston head having a central opening for receiving the stem of a poppet valve having a head which mates with the valve seat in a closed position. The central opening in the piston head which receives the valve stem serves to guide axial movement of the poppet valve relative to the piston. A spring is mounted between the head of the poppet valve and the piston head so as to urge the valve head away from the piston to an open position. The piston operating means, e.g., a control valve, serves to move the piston relative to the valve body between open and closed positions.

In the preferred embodiments, the spring between the head of the poppet valve and the piston head has a strength providing compression force equal to a pressure drop across the valve at a predetermined maximum flow rate, whereby the valve is closed by a flow rate exceeding the predetermined maximum flow rate, thus providing the so-called "flow fuse" feature of the present invention.

In one preferred embodiment, the piston and the valve body have defined therebetween an annular chamber wherein pressure is controlled by the piston operating means. The piston has at least one flange extending into and dividing the annular chamber and sealing against the inner wall of the valve body. The piston flange divides the annular chamber into a second chamber which is in constant communication with the low pressure reservoir and a first chamber which is in communication with the piston control means, e.g., control valve, for switching pressure in the first chamber between a high pressure source for moving the piston to an open position and a low pressure reservoir for allowing the piston to move to its closed position. Preferably, the control valve is a normally closed valve with the poppet valve being closed when the control valve is in its normally closed position. In one preferred embodiment, the piston has two flanges extending into the annular chamber to define first, second and third chambers wherein the third chamber is constantly open to the cylindrical hollow of the piston.

It is further preferred that the shut-off valve of the present invention be provided with at least one sensor for determining flow rate through the hollow interior of the piston ("cylindrical hollow"). Flow rate can be determined by use of two or more pressure sensors spaced along the flow path for the purpose of measuring pressure drop which can be used to calculate flow rate. An electronic control unit or computer receives signal from the sensor(s), computes the actual flow rate based on the signals and compares the actual flow rate against the commanded flow rate. If the actual flow rate exceeds the commanded flow rate, the electronic control unit issues a command signal to the control valve to close the poppet valve.

In a preferred embodiment the present invention also provides a new feature referred to herein as a "flow fuse." If the accumulator outlet line is ever broken or mistakenly opened and the flow exceeds a pre-determined level that would otherwise be the maximum intended flow rate, the valve automatically shuts off. In this preferred embodiment the spring holding the valve open is calibrated so that it allows the valve to close whenever the flow exceeds the pre-determined maximum allowable rate.

The present invention also provides for more rapid closing of the valve and opening of the valve. Very rapid closing of the valve (generally less than 50 milliseconds) is provided in response to an electronic command. The valve may be commanded to close if the computer senses that the outlet flow rate is higher than that expected for that instant, suggesting a leak in the system smaller than that which would trigger the emergency "flow fuse" shut off. The computer controls and therefore continually knows the outlet flow rate and by comparing the pressures at two locations in the outlet line (to determine a pressure drop which can be correlated to flow rate), or by other flow rate measurement means, and continuously compares the commanded flow rate to the measured flow rate. If the measured flow rate exceeds the commanded flow rate, the computer will command the valve to shut. The computer also commands the valve to shut when the system is turned off, e.g., when a key is turned off. The command to close (or shut) results in a very rapid closing since the pressure is essentially equal on both sides of the valve when it is open, and the closing force must only overcome valve friction and provide the desired acceleration.

Opening the valve after a period of more than a few minutes (when the pressure downstream of the valve has dropped) requires a very large actuation force because it must not only overcome friction and accelerate the mass of the valve assembly, it must also overcome the force of the pressure in the accumulator acting on the accumulator side of the valve. In the extreme, when the downstream pressure reaches its lowest value (for example, 100 psi) and the accumulator pressure is at its highest value (for example, 5000 psi) a very large force is required to open the valve. For example, if the poppet valve face area is one square inch and the pressure difference is 4,900 psi, then the actuator would have to overcome an additional 4,900 pounds of force to move the valve. Opening the valve of the present invention requires a much smaller actuation force since a small parallel line connects the accumulator to the downstream side of the main valve and contains a small on/off valve which is first commanded to open to equalize the pressure downstream of the main valve with the pressure in the accumulator. The only flow in the small parallel line is that required to pressurize the downstream volume, which is very small. When the pressure downstream of the main valve is the same as the accumulator pressure, the actuation force need be only just sufficient to overcome friction and to accelerate the mass of the valve assembly at the desired rate.

The present invention utilizes a captive o-ring (or similar sealing material) in the poppet valve seat to provide for positive sealing with zero leakage. This prevents the accumulator from slowly losing pressure due to the seal slowly leaking as it would absent a positive seal.

BRIEF DESCRIPTION OF THE DRAWINGS

FIG. 6 is a cross-sectional view of a bladder-type accumulator equipped with a shut-off valve, in accordance with a fifth embodiment of the present invention, in combination with an electric control unit and control valve.

DESCRIPTION OF THE PREFERRED EMBODIMENTS

Figure 1:
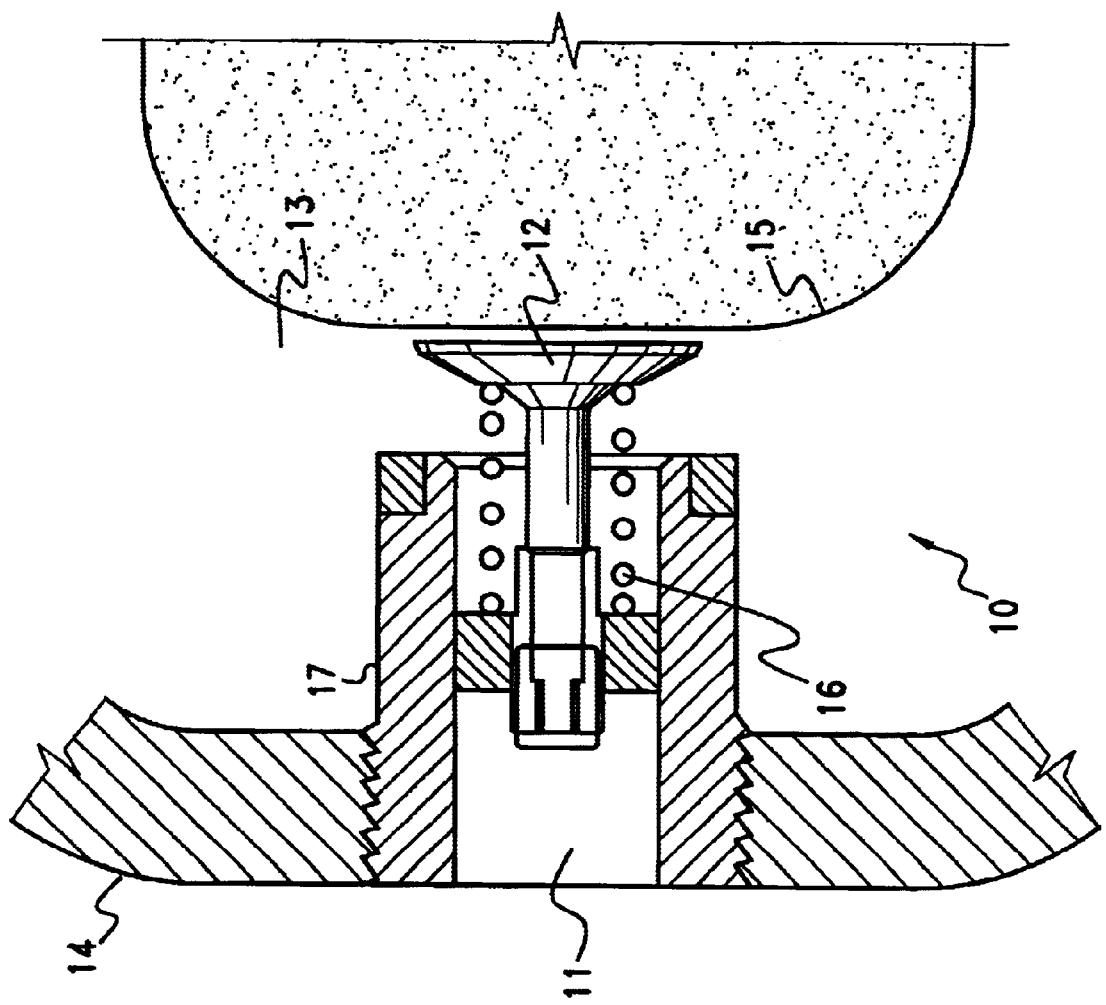
FIG. 1 is a partial sectional view of a bladder-type accumulator equipped with the shut-off valve in accordance with the prior art.
Figure 2:
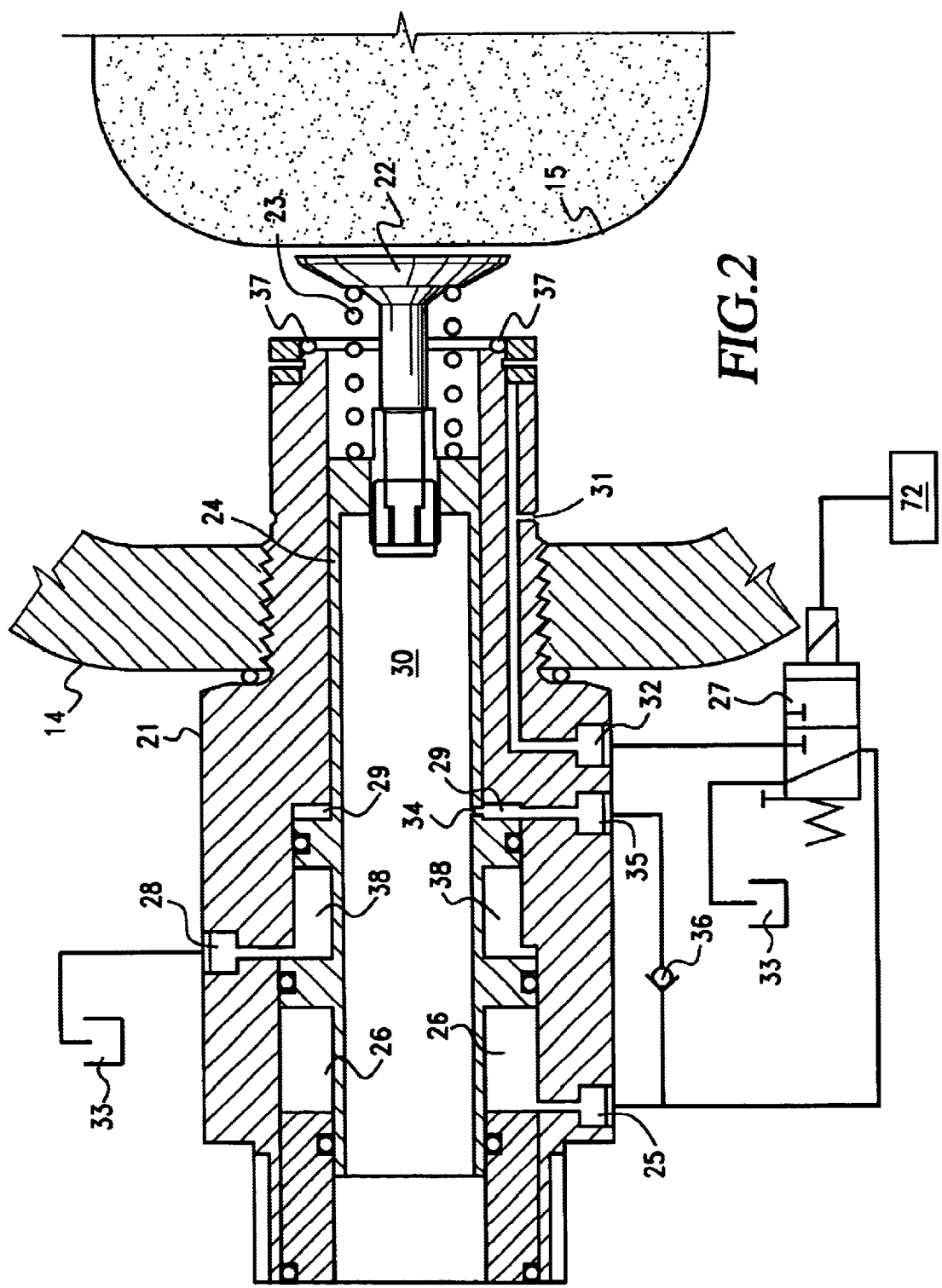
FIG. 2 is a partial cross-sectional view of a bladder type accumulator equipped with a shut-off valve, in accordance with a first embodiment of the present invention, in combination with an electric control unit and control valve.

The present invention works well with all accumulator designs, but the preferred embodiment described below uses a bladder accumulator 10 to illustrate the invention. FIG. 2 shows an integrated valve assembly 21 as a first preferred embodiment of the present invention. Integrated valve assembly 21 replaces the conventional anti-extrusion valve assembly 17 of FIG. 1. Poppet valve 22 and spring 23 of FIG. 2 perform the same anti-extrusion function as poppet valve 12 and spring 16 of FIG. 1. However, the base of valve 22 is mounted in a slidable piston assembly 24, in contrast to valve 12 of FIG. 1 which is fixed in an immovable base. More specifically, valve 22 includes a head portion 22a and a stem portion 22b which extends into a central opening 24b in the piston head 24a to guide valve 22 in axial movement relative to piston head 24a.

Slidable piston assembly 24 is slidably mounted in the cylindrical hollow 30 (hereinafter "chamber 30") of valve body 20. Slidable piston assembly 24 can be moved to the left and thereby close valve 22 on command by reducing the pressure at port 25 and within chamber 26, from system high pressure at ports 31 and 32, to system low pressure at reservoir 33. When CPU 72 issues a command to close valve 22, electric power to control valve 27 (generally referred to as a normally closed valve) is terminated. The choice of a normally closed valve for control valve 27 insures that the accumulator will shut off in the event of loss of electric power, a fail-safe design feature. Since the pressure on the right and left faces of valve 22 are equal or approximately equal when the valve 22 is open (only difference is due to a small pressure drop from the one face to the other face caused by any fluid flow into or out of the accumulator), assembly 24 will rapidly move to the left to shut off valve 22. Chamber 38 is always open to low pressure reservoir 33 through port 28. Chamber 29 is always open to accumulator downstream pressure in chamber 30 through port 34. Accumulator downstream pressure in chamber 30 is prevented from causing flow through port 35 to either port 25 or low pressure reservoir 33 (after command to close valve 22) by check valve 36.

An elastomer seal 37 is provided as a seat for poppet valve 22 to assure zero leakage from the accumulator when valve 22 has been commanded shut. A zero leakage accumulator shut off valve is critical for a hydraulic hybrid vehicle since the accumulator downstream pressure in chamber 30 is exposed to several valves (not shown) that are likely to experience slow leakage, and the accumulator must retain pressure after several weeks of vehicle non-use since the energy stored in the accumulator is used to start the vehicle's engine and to assist in the initial vehicle acceleration.

Spring 23 is calibrated to allow valve 22 to "slam shut" when the flow from the accumulator exceeds the maximum flow ever needed by the vehicle. Once the pressure drop from the right face of valve 22 to the left side of valve 22 reaches the pressure drop at the maximum allowable flow, the force of this pressure drop acting on the right face of valve 22 will overcome the force of spring 23 and begin to close valve 22. When valve 22 begins to close, the pressure drop increases due to flow velocity increases, and the valve 22 sees an increase force to close which causes the valve 22 to close extremely fast. This "fuse valve" function is an extremely important safety feature for hydraulic hybrid vehicles since the accumulator stored energy is shut off in the event of an accumulator downstream system rupture.

Another important safety feature included in the present invention is the ability to compare the pressure at port 35 to the pressure at port 32. This pressure difference is correlated to flow rate of liquid leaving the accumulator. This calculated flow rate is compared to the flow rate being commanded by the vehicle's computer (electronic control unit) to drive the vehicle at each instant. If the calculated flow rate exceeds the commanded flow rate by a specified safety margin, the computer will command valve 22 to shut by movement of slidable piston assembly 24 to the left. This feature will detect a small system leak (which can still be dangerous) that has not yet reached the maximum allowable flow necessary to trigger the "fuse valve" function previously described. This mode of closing wherein the entire slidable piston assembly 24 moves to the left relative to valve body 20 is different from the "fuse valve" function wherein only poppet valve 22 moves to the left relative to valve body 20.

After valve 22 has been shut, the downstream pressure in chamber 30 will begin to drop, and the difference between the accumulator pressure at port 31 and the downstream pressure in chamber 30 will increase. To reopen valve 22 and overcome the force associated with the pressure difference across the valve 22, a very large force must be applied to the left side of valve 22 (with associated structural and other problems), or as is the case with the present invention, the pressure is first equalized across valve 22 so that a much smaller force can quickly open the valve 22. When a command to open valve 22 is issued, control valve 27 is opened to connect accumulator high pressure from port 32 to the lower pressures of port 25 and 35. The high pressure liquid pressurizes chamber 26 and flows through chamber 29 and port 34 to increase the accumulator downstream pressure in chamber 30. The high pressure within chamber 26 acts on slidable piston assembly 24 and moves it to the right. As pressure in chamber 30 equalizes with pressure at 31, spring 23 opens valve 22.

Integrated valve assembly 21 can also be used to allow the hydraulic hybrid vehicle to operate in a hydrostatic mode (when the engine can produce a higher downstream pressure in chamber 30 than is instantly available in the accumulator at 31). When hydrostatic operation is desired, valve 22 is commanded to shut as described above. When downstream pressure in chamber 30 rises above accumulator pressure 31 a net force will act on the left face of valve 22 urging valve 22 toward its open position. It is only necessary to size the area of the piston within chamber 29 to overcome this force, and valve assembly 21 will perform well to control hydrostatic mode operation. When normal, accumulator assisted operation is again desired, the downstream pressure in chamber 30 will be reduced to near accumulator pressure and valve 22 will be opened as previously described.

Figure 3:
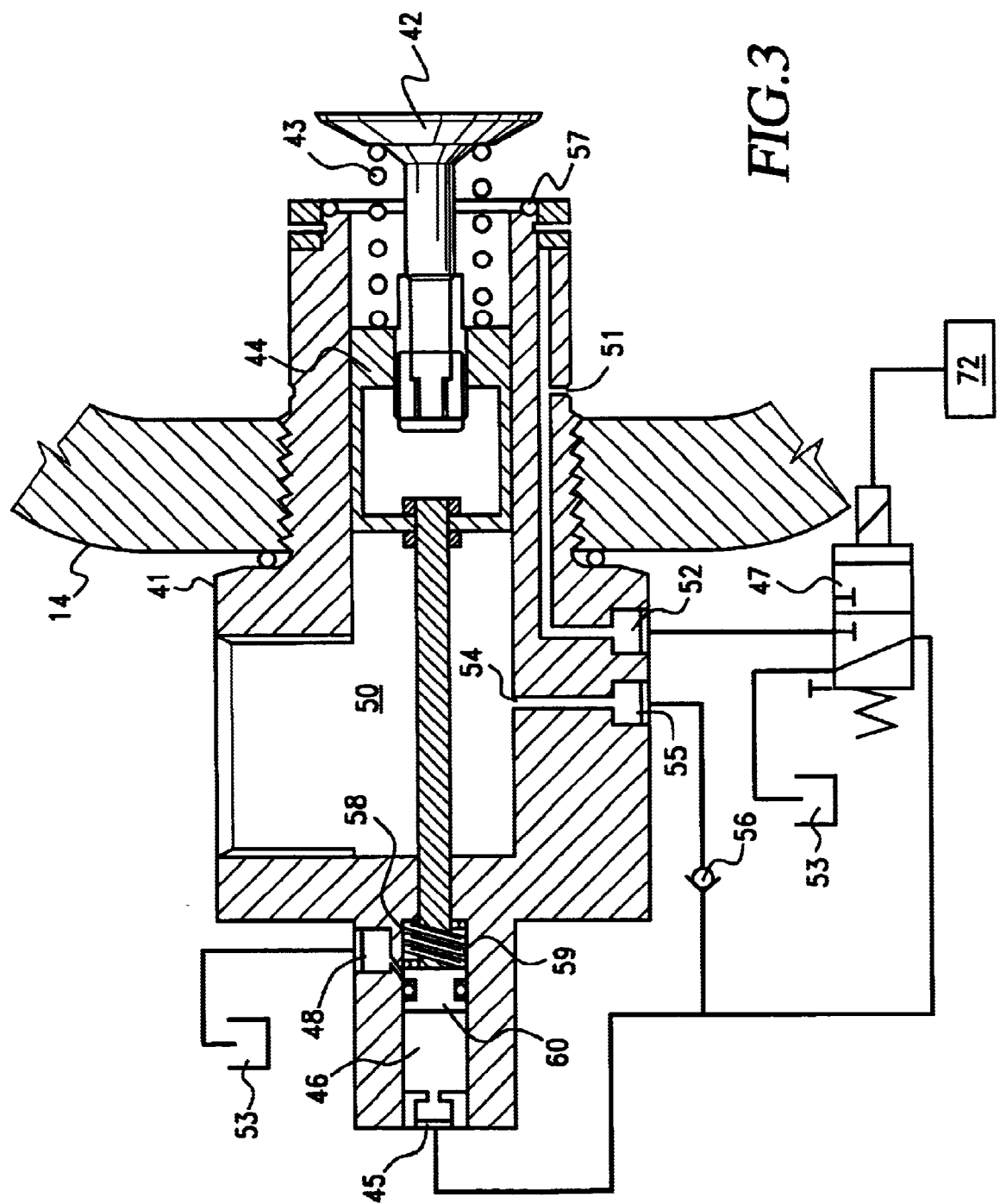
FIG. 3 is a partial sectional view of a bladder-type accumulator equipped with a shut-off valve, in accordance with a second embodiment of the present invention, in combination with an electric control unit and control valve.

FIG. 3 shows a second preferred embodiment of the present invention. Integrated valve assembly 41 replaces the anti-extrusion valve assembly 17 of FIG. 1. Poppet valve 42 and spring 43 of FIG. 3 perform the same anti-extrusion function as poppet valve 12 and spring 16 of FIG. 1. However, the base of valve 42 is mounted in a slidable piston assembly 44, in contrast to valve 12 of FIG. 1 which is fixed to a base.

Slidable assembly 44 can be moved to the left and thereby close valve 42 on command by reducing the pressure at port 45 and within chamber 46, from system high pressure at ports 51 and 52, to system low pressure at reservoir 53. Control valve 47 moves to the position shown in FIG. 3 when a command to close valve 42 is given. Since the pressure on the right and left faces of valve 42 are equal or nearly equal when valve 42 is open, assembly 44 will rapidly move to the left to shut off valve 42. Chamber 58 is always open to low pressure reservoir 53 through port 48. Chamber 58 contains spring 59 which applies force on assembly 44 to rapidly move assembly 44 to the left to shut off valve 42. Check valve 56 prevents accumulator downstream pressure in chamber 50 from causing liquid flow through port 55 to either port 45 or low pressure reservoir 53. An elastomer seal 57 serves as a seat for poppet valve 42 to assure zero leakage from the accumulator when valve 42 has been commanded shut.

Spring 43 is calibrated to allow valve 42 to "slam shut" when the flow from the accumulator exceeds the maximum flow ever needed by the vehicle.

After valve 42 has been shut, the downstream pressure in chamber 50 will begin to drop, and the difference between the accumulator pressure 51 and the downstream pressure in chamber 50 will increase. To re-open valve 42, the pressure across valve 42 is equalized so a relatively small force can quickly open valve 42. When a command to open valve 42 is given, control valve 47 is opened connecting accumulator high pressure from port 52 to the lower pressures of ports 45 and 55. The high pressure fluid pressurizes chamber 46 and flows through port 54 to increase accumulator downstream pressure in chamber 50. The high pressure within chamber 46 acts on slidable piston 60, which is rigidly attached to and is therefore a portion of slidable assembly 44, and moves it to the right. As pressure in chamber 50 equalizes with pressure at port 51 spring 43 opens valve 42.

Figure 4:
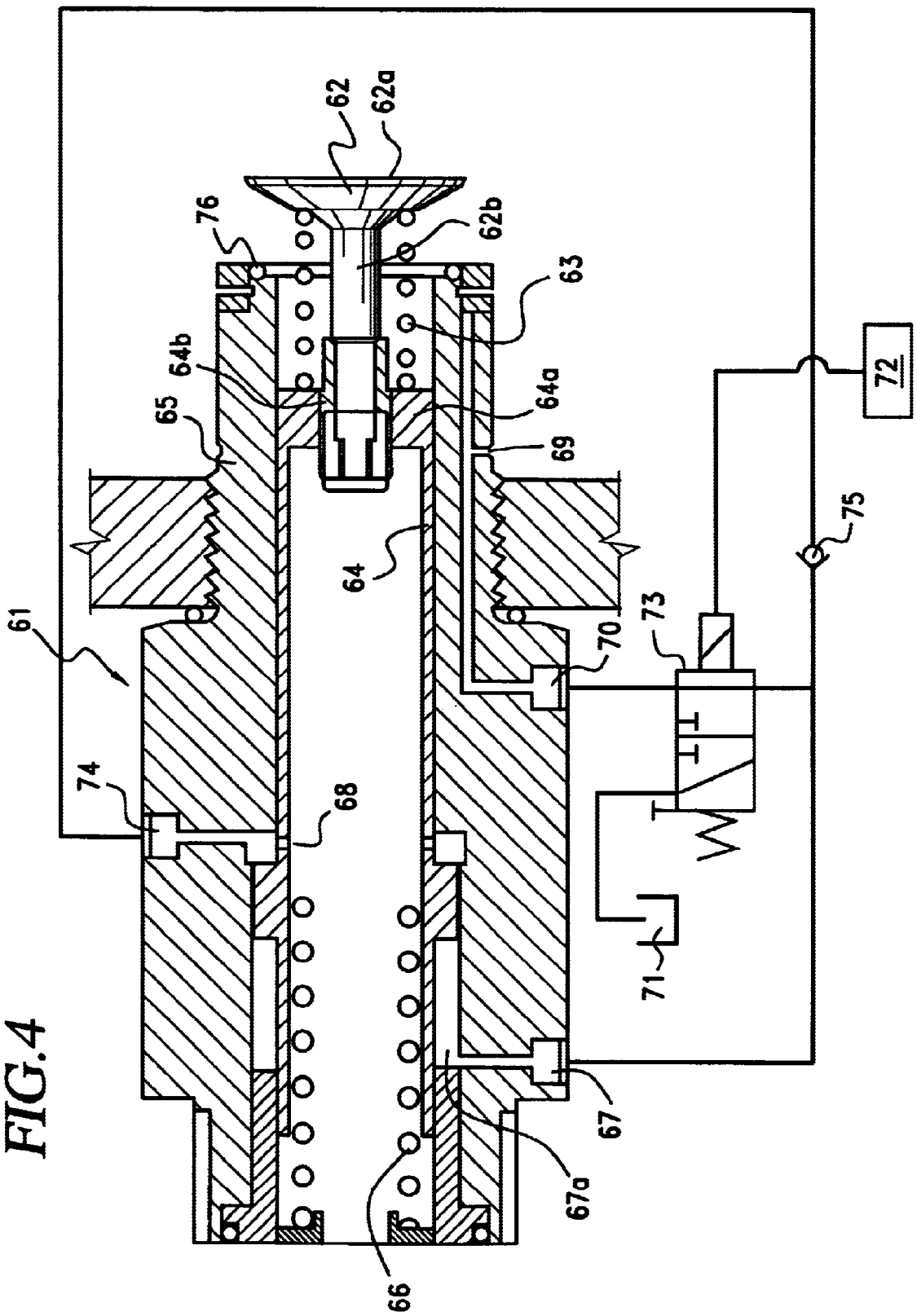
FIG. 4 is a cross-sectional view of a shut-off valve, in accordance with a third embodiment of the present invention, in combination with an electric control unit and control valve.

FIG. 4 shows an integrated valve assembly 61 as a third preferred embodiment of the present invention. Poppet valve 62 and spring 63 perform the same anti-extrusion function as poppet valve 12 and spring 16 of FIG. 1. However, the base of valve 62 is mounted in a slidable piston assembly 64, in contrast to valve 12 of FIG. 1 which is fixed in an immovable base. More specifically, valve 62 includes a head portion 62a and a stem portion 62b which extends into a central opening 64b in the piston head 64a to guide valve 62 in axial movement relative to piston head 64a.

Spring 66 biases slidable piston assembly 64 to the right against the pressure within the accumulator. Slidable piston assembly 64 can be moved to the left relative to valve body 65 and thereby close valve 62 on command by reducing the pressure at port 67 and within chamber 67a, from system high pressure at ports 69 and 70, to system low pressure at reservoir 71. When CPU 72 issues a command to close valve 62, electric power to control valve 73 (generally referred to as a normally closed valve) is terminated. As in the previously described embodiments, the choice of a normally closed valve for control valve 73 insures that the accumulator will shut off in the event of loss of electric power, a fail-safe design feature. Accumulator downstream pressure in chamber 68 is prevented from causing flow through port 74 to port 67 by check valve 75. An elastomer seal 76 is provided as a seat for poppet valve 62.

Spring 63 is calibrated to allow valve 62 to "slam shut" when the flow from the accumulator exceeds the maximum flow predetermined to be the maximum ever needed by the vehicle.

This third embodiment also has the capability to compare the pressure at port 74 to the pressure at port 70. This pressure difference is correlated to flow rate of fluid leaving the accumulator. This calculated flow rate is compared to the flow rate being commanded by the vehicle's computer to drive the vehicle at each instant. If the calculated flow rate exceeds the commanded flow rate by a specified safety margin, the computer 72 will command valve 62 to shut by movement of slidable piston assembly 64 to the left.

When a command to open valve 62 is issued, control valve 73 is opened to connect accumulator high pressure from port 69 to the lower pressures of port 67 and port 74. The high pressure fluid pressurizes chamber 67a and flows through port 74 to increase the accumulator downstream pressure in chamber 68. The high pressure within chamber 67a acts on slidable piston assembly 64 along with spring 66 to move it to the right. As pressure in chamber 68 equalizes with pressure at 70, spring 63 opens valve 62.

Figure 5:
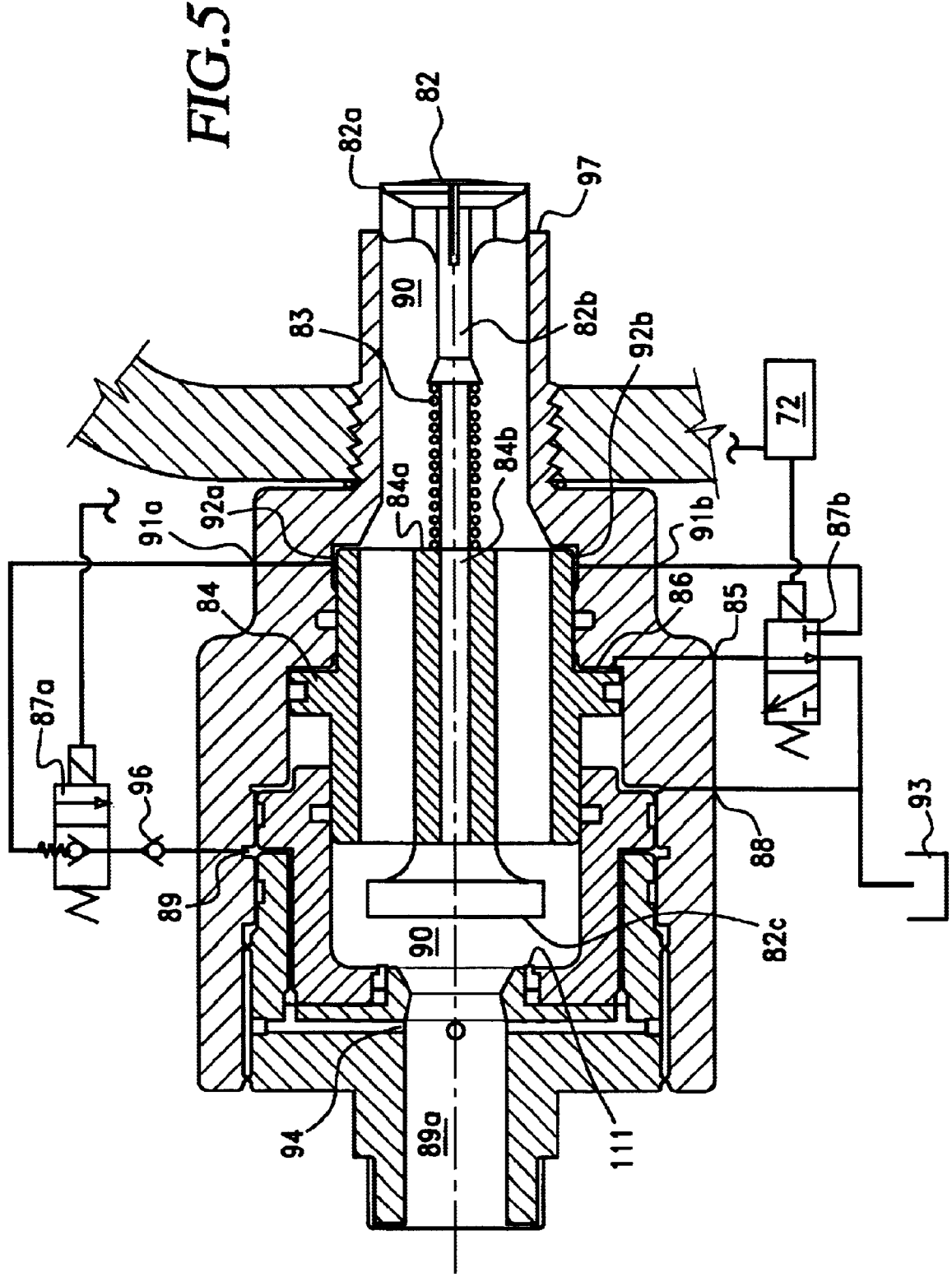
FIG. 5 is a cross-sectional view of a shut-off valve, in accordance with a fourth embodiment of the present invention, in combination with an electric control unit and control valve.

Unlike the above-described embodiments wherein the poppet valve seals to the right of slidable piston assembly 84 against a seat at 97, the fourth embodiment depicted in FIG. 5 has a poppet valve head 82c sealing against an internal seat 111 to the left of slidable piston assembly 84. This configuration allows the slidable piston assembly 84 to be more easily moved to the left (relative to the embodiments of FIGS. 2, 3 and 4) and outside of the portion of chamber 90 that is located within the structure of the accumulator. The portion of chamber 90 within the accumulator needs to be of the smallest diameter possible and still allow a maximum liquid flow rate without unacceptably high flow losses (pressure drop) to minimize impact on the design of the accumulator structure (i.e., a large opening requires a stronger structure around the opening). Placing the slidable piston assembly 84 outside the accumulator portion of chamber 90 allows the diameter of chamber 90 which extends into the accumulator to be smaller, in comparison to similar structure in the embodiments of FIGS. 2, 3 and 4. However, the basic function and features are similar to the previous embodiments. To open the valve 82, pressure equalization valve 87a (normally closed valve) opens and the pressure in chamber 89a downstream of the seal at 111 is made equal to the pressure within chamber 90. Valve 87b moves to the energized position connecting chamber 86 through port 85 with lower pressure reservoir 93. Slidable piston assembly 84 moves to the right (position shown in FIG. 5) allowing spring 83 to open valve 82 as pressures equalize between chambers 89a and 90. To shut valve 82, valve 87b is unenergized (normally 'off' position), which shutting serves to connect chamber 86 through port 85 with pressurized chamber 92b through port 91b. High pressure within chamber 86 acts on piston assembly 84 and moves it to the left shutting valve 82 as the face of valve head 82c seals against seal 111. The pressure in chamber 98 is always at the pressure of low pressure reservoir 93.

FIG. 6 shows a fifth embodiment which emphasizes the pressure equalization function. A conventional ball valve 121 is attached to anti-extrusion valve assembly 122, with the flow-fuse calibrated spring 123, the anti-extrusion flow-fuse poppet valve 124, positive seal 125 and accumulator (high pressure) access port 126 modifications as described in the previous embodiments. To open the accumulator shut-off valve 121 (in this case a ball valve), control valve 127 (normally closed as shown) is opened and high pressure from the accumulator at port 126 is provided to downstream port 128 to equalize pressure across the ball 129, and to ball valve actuator 130 to provide torque to rotate ball shaft 131 and ball 129 against the closing torque of spring 132 (or other closing torque means) to open the valve 121. To close valve 121, control valve 127 is closed (as shown) and without high pressure to actuator 130, spring 132 closes valve 121.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed:

1. A hydraulic hybrid accumulator shut-off valve comprising:

a valve body having a cylindrical hollow and a valve seat surrounding one end of said cylindrical hollow;

a main piston including a piston head having a central opening and slidably mounted within said cylindrical hollow;

a poppet valve including a valve head, mating with said valve seat in a closed position, and a valve stem extending from said valve head into said central opening to guide said valve member in axial movement relative to said main piston;

a spring mounted between said valve and said main piston for urging said valve toward an open position; and piston operating means for moving said main piston relative to said valve body between open and closed positions.

2. A hydraulic hybrid accumulator shut-off valve according to claim 1 wherein said spring has a strength providing a compressive force equal to a pressure drop across said valve at a predetermined maximum flow rate, whereby said valve is closed by a flow rate exceeding said predetermined maximum flow rate.

3. A hydraulic hybrid accumulator shut-off valve according to claim 1 wherein said main piston and said valve body-define an annular chamber therebetween and said piston operation means controls a pressure within said annular chamber.

4. A hydraulic hybrid accumulator shut-off valve according to claim 3 wherein said main piston has a first flange sealed against said valve body and separating first and second chambers within said annular chamber, wherein said second chamber is in constant communication with a low pressure reservoir and said piston operating means is a control valve in communication with said first chamber for switching said first chamber between communication with a high pressure source for moving said piston to said open position and communication with a low pressure reservoir for allowing said piston to move to said closed position.

5. A hydraulic hybrid accumulator shut-off valve according to claim 4 wherein said control valve is a normally closed valve, said poppet valve being closed when said control valve is in said normally closed position.

6. A hydraulic hybrid accumulator shut-off valve according to claim 4 wherein said control valve communicates with the high pressure source through a passageway running through said valve body to a radially extending port opening to said high pressure adjacent a distal end of said valve body where said valve seat is located.

7. A hydraulic hybrid accumulator shut-off valve according to claim 4 wherein said main piston has a second flange separating a third chamber within said annular chamber from said second chamber and wherein said third chamber is constantly open to said cylindrical hollow.

8. A hydraulic hybrid accumulator shut-off valve according to claim 7 wherein said third chamber is in communication with said first chamber and said control valve through a check valve which prevents flow from said cylindrical hollow to said first chamber.

9. A hydraulic hybrid accumulator shut-off valve according to claim 1 wherein said valve seat contains an annular ring of an elastomer seal.

10. A hydraulic hybrid accumulator shut-off valve according to claim 1 wherein said piston operating means is a control valve and wherein said shut-off valve further comprises:
    at least one sensor for determining flow rate through said cylindrical hollow;
    an electronic control unit for receiving signals from said sensor, for comparing actual flow based on said signals with a commanded flow rate and, if said actual flow rate exceeds said commanded flow rate, issuing a command signal to said control valve to close said poppet valve.

11. A hydraulic hybrid accumulator shut-off valve according to claim 1 further comprising:
    a second piston rigidly connected to said main piston through a piston rod;
    an axial bore forming a closed chamber in said valve body in which said second piston is slidably mounted, said second piston dividing said closed chamber into two subchambers one of which remains in communication with a low pressure source, and the other of which is switched between said low pressure source and a high pressure source by a control valve serving as said piston operating means.

12. An accumulator for a hydraulic vehicular drivetrain comprising:
    a tank;
    a bladder mounted within said tank and containing a fluid, said tank defining a fluid space surrounding said bladder; and
    a shut-off valve in communication with said fluid space and comprising:
        a valve body having a cylindrical hollow and a valve seat surrounding one end of said cylindrical hollow;
        a main piston including a piston head having a central opening and slidably at mounted within said cylindrical hollow;
        a poppet valve including a valve head, mating with said valve seat in a closed position, and a valve stem extending from said valve head into said central opening to guide said valve member in axial movement relative to said main piston;
        a spring mounted between said valve and said main piston for urging said valve toward an open position; and
        piston operating means for moving said main piston relative to said valve body between open and closed positions.

13. An accumulator according to claim 12 wherein said spring has a strength providing a compressive force equal to a pressure drop across said valve at a predetermined maximum flow rate, whereby said valve is closed by a flow rate exceeding said predetermined maximum flow rate.

14. An accumulator according to claim 12 wherein said main piston and said valve body define an annular chamber therebetween and said piston operation means controls a pressure within said annular chamber.

15. An accumulator according to claim 14 wherein said main piston has a first flange sealed against said valve body and separating first and second chambers within said annular chamber, wherein said second chamber is in constant communication with a low pressure reservoir and said piston operating means is a control valve in communication with said first chamber for switching said first chamber between communication with said fluid space within said tank establishing said open position and communication with a low pressure reservoir for allowing said piston to move to said closed position.

16. An accumulator according to claim 15 wherein said control valve is a normally closed valve, said poppet valve being closed when said control valve is in said normally closed position.

17. An accumulator according to claim 15 wherein said control valve communicates with the liquid space in the accumulator through a passageway running through said valve body to a radially extending port opening to said fluid space adjacent a distal end of said valve body where said valve seat is located.

18. An accumulator according to claim 15 wherein said main piston has a second flange separating a third chamber within said annular chamber from said second chamber and wherein said third chamber is constantly open to said cylindrical hollow.

19. An accumulator according to claim 18 wherein said third chamber is in communication with said first chamber and said control valve through a check valve which prevents flow from said cylindrical hollow to said first chamber.

20. An accumulator according to claim 12 wherein said valve seat contains an annular ring of an elastomer seal.

21. An accumulator according to claim 12 wherein said piston operating means is a control valve and wherein said shut-off valve further comprises:
    at least one sensor for determining flow rate through said cylindrical hollow;
    an electronic control unit for receiving signals from said sensor, for comparing actual flow based on said signals with a commanded flow rate and, if said actual flow rate exceeds said commanded flow rate, issuing a command signal to said control valve to close said poppet valve.

22. An accumulator according to claim 12 further comprising:
- a second piston rigidly connected to said main piston through a piston rod;
- an axial bore forming a closed chamber in said valve body in which said second piston is slidably mounted, said second piston dividing said closed chamber into two subchambers one of which remains in communication with a low pressure source, and the other of which is switched between said low pressure source and said liquid space by a control valve serving as said piston operating means.

23. A hydraulic hybrid accumulator shut-off valve comprising:
- a valve body having a cylindrical hollow and a valve seat surrounding one end of said cylindrical hollow;
- a poppet valve including a valve head, mating with said valve seat in a closed position, a valve stem extending from said valve head and a guide member having a central opening receiving said valve stem to guide movement of said poppet valve;
- a first spring mounted between said poppet valve and said guide member for urging said poppet valve toward an open position;
- a ball valve rotatably mounted between open and closed positions and in fluid communication with said cylindrical hollow;
- a second spring biasing said ball valve toward rotation in one direction;
- a fluid actuator for rotating said valve in a second direction, opposite said one direction; and
- a control valve in communication with said fluid actuator for selectively supplying a high pressure fluid to said fluid actuator.

24. An accumulator for a hydraulic vehicular drivetrain comprising:
- a tank;
- a bladder mounted within said tank and containing a fluid, said tank defining a fluid space surrounding said bladder;
- a shut-off valve in communication with said fluid space and comprising:
    - a poppet valve including a valve head, mating with said valve seat in a closed position, a valve stem extending from said valve head and a guide member having a central opening-receiving said valve stem to guide movement of said poppet valve;
    - a first spring mounted between said poppet valve and said guide member for urging said poppet valve toward an open position;
    - a ball valve rotatably mounted between open and closed positions and in fluid communication with said cylindrical hollow;
    - a second spring biasing said ball valve toward rotation in one direction;
    - a fluid actuator for rotating said valve in a second direction, opposite said one direction; and
    - a control valve in communication with said fluid actuator for selectively supplying a high pressure fluid to said fluid actuator.

* * * * *